United States Patent

[111] 3,592,043

[72] Inventor Miner Nelson Munk
    Walnut Creek, Calif.
[21] Appl. No 793,948
[22] Filed Jan. 27, 1969
[45] Patented July 13, 1971
[73] Assignee Varian Associates
    Palo Alto, Calif.

[54] MICRO-ADSORPTION DETECTOR AND METHOD OF USING SAME
    7 Claims, 12 Drawing Figs.
[52] U.S. Cl. .................................................. 73/23.1,
    73/61.1C, 23/254
[51] Int. Cl. ............................................... G01n 31/08,
    G01n 11/00
[50] Field of Search........................................... 73/23.1,
    61.1 LC, 25, 26, 27, 29

[56] References Cited
    UNITED STATES PATENTS
    2,596,992  5/1952  Fleming......................  73/27
    2,633,737  4/1953  Richardson ................  73/27
    2,868,011  1/1959  Coggeshall..................  73/23.1
    3,263,488  8/1966  Martin...........................  73/23.1
    3,408,854  11/1968 Larson .........................  73/23.1

OTHER REFERENCES
Hupe et al., " A Micro Adsorption Detector for General Use in Liquid Chromatography," appearing in JOURNAL OF GAS CHROMATOGRAPH April 1967, page 197 etseq Paynes, " Gas Analysis by Measurement of Thermal Conductivity," pages 87 and 165 dated Feb. 1948 Library # QD 121 D3

Primary Examiner—Richard C Queisser
Assistant Examiner—Ellis J. Koch
Attorneys—William J. Nolan and Leon F. Herbert ABSTRACT: A microadsorption detector is disclosed having at least three adsorption-heat-detection cells serially disposed in close proximity to each other along the flow path for a fluid stream in which constituents are to be detected. The third adsorption-heat-detection cell permits the electrical outputs of the cells to be combined in at least two pairs to form at least two separate composite output signals. The composite signals each comprise a combination of the outputs of at least two cells. Use of different adsorptive fill materials in the pairs of cells yields qualitative information concerning the constituents to be detected in the fluid stream. At least one of the cells would normally be filled with a relatively inert, nonadsorptive material and serve as a reference cell to compensate for extaneous temperature changes common to all the cells. Four or more cells can be arranged to compensate for flow sensitivity. The signal from one pair of cells, both members of which are filled with the same type of adsorptive material, will compensate that part of the signal from other pairs of cells which is due to change in flow rate.

PATENTED JUL 13 1971 3,592,043

INVENTOR.
MINER N. MUNK
BY Wm J Nolan
ATTORNEY 3,592,043

INVENTOR.
MINER N. MUNK

BY

ATTORNEY

MICRO-ADSORPTION DETECTOR AND METHOD OF USING SAME

DESCRIPTION OF THE PRIOR ART

Heretofore, microadsorption detector cells have been serially arranged in the flow path of the output of a liquid chromatographic column for detecting the output peaks. Such a detector is described in the Journal of Gas Chromatography, page 197, Apr. 1967. While such a detector has numerous advantages for use in liquid chromatography (LC), it has one disadvantage. This disadvantage is that the detector is relatively sensitive to changes in fluid flow rate. This flow sensitivity precludes the use of the detector with pulsating type pumps and translates a long term change in fluid flow rate into an annoying base line drift. The reason for the flow sensitivity is that the heat dissipated in the upstream thermistor is carried downstream to the second thermistor. The amount of heat carried to the downstream thermistor is a function of the flow rate.

Therefore, it is desirable to provide a microadsorption detector the output of which is relatively independent of the flow rate such that the detector may be used with conventional pulsating pumps. It is also desired that the microadsorption detector be made more specific and more qualitative as regards the detection of certain sample constituents.

SUMMARY OF THE PRESENT INVENTION

The principal object of the present invention is the provision of an improved microadsorption detector useful, for example, as a detector for L.C. and for analyzing certain sample-solvent-adsorbent systems.

One feature of the present invention is the provision of at least three adsorption detector cells serially disposed along the flow path of a fluid stream, whereby the individual outputs of each of the detector cells may be combined in at least two pairs to form at least two separate composite output signals, such composite signals each comprising a combination of the outputs of at least two cells, thus permitting comparison of the output signals to obtain improved detection of certain constituents of the fluid stream.

Another feature of the present invention is the same as the preceding feature wherein there are at least four of the adsorption detection cells serially disposed along the stream.

Another feature of the present invention is the same as any one or more of the preceding features wherein one pair of adsorption cells includes a different active adsorptive packing material than the other pair of cells, whereby comparison of the output signals yields qualitative information concerning the adsorptive characteristics of the sample under analysis.

Another feature of the present invention is the same as the first and second features wherein one of the pairs of detector cells includes a relatively active adsorptive fill material, whereas the second pair of detector cells includes an inactive or inert fill material, if any, and wherein the output of the second pair of detector cells is subtracted from the output of the first pair of detector cells to decrease the sensitivity of the overall detector to fluid flow rate, whereby the detector may be utilized with pulsating type pumps.

Another feature of the present invention is the same as one or more of the preceding features including the adsorptive detector cells in combination with a liquid chromatographic column such that the detector cells are disposed to detect constituents in the effluent liquid stream of the column.

Other features and advantages of the present invention will become apparent upon a perusal of the following specification taken in connection with the accompanying drawings wherein:

BRIEF DESCRIPTION OF THE DRAWINGS

FIG. 7 is a schematic circuit diagram of a microadsorptive detector incorporating features of the present invention.

DESCRIPTION OF THE PREFERRED EMBODIMENTS

Figure 1:
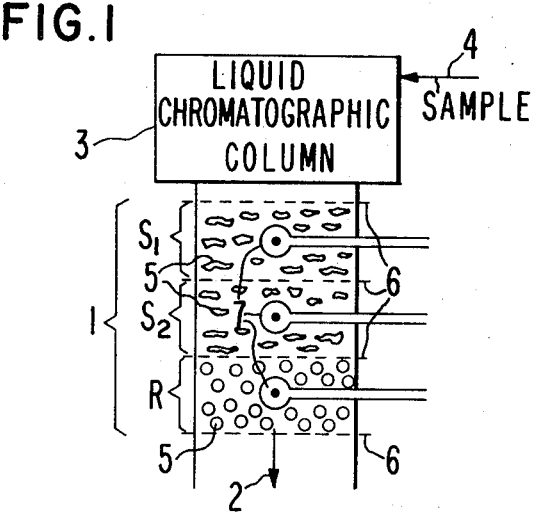
FIG. 1 is a schematic line diagram, partly in block diagram form, of a chromatograph employing features of the present invention.

Referring now to FIG. 1, there is shown a microadsorption detector 1 incorporating features of the present invention. The adsorption detector includes 3 detector cells $S_1$, $S_2$ and R serially arranged in close proximity to each other along the flow path of a fluid stream 2. The fluid stream may either be a gas or a liquid. In a preferred embodiment the adsorption detector 1 is employed for analyzing the effluent stream of a liquid chromatographic column 3 into which a sample to be analyzed is injected, as indicated at 4. The output of the chromatographic column 3 comprises a time separation of sample constituents in a solvent stream. As the sample stream 2 passes through the detector 1 the sample peaks are sequentially adsorbed and sometimes desorbed from the packing material 5, if any, positioned within each of the detector cells $S_1$, $S_2$ and R. The adsorptive fill material 5 is held within each of the cells by means of suitable fluid permeable walls such as filter paper membranes 6.

The microadsorption detector 1 makes use of the same physical effect which is used in separation by elution chromatograph, i.e., the different affinities of the eluent and the eluted substance for the stationary phase. Thus, the method is equally valid when the eluent is gaseous or liquid, the stationary phase solid or liquid. With each sequential step of adsorption and desorption in the various cells of the detector 1, there is associated both an evolution and an uptake of heat whose values are of equal but of opposite sign. The heats of adsorption and desorption are proportional to the concentration of the substance in the stationary phase. A change in the concentration of the substance in the eluent will, therefore, cause a change of temperature, provided the eluted substance and the eluent have differing affinities for the stationary phase. Thus, there is a rise in temperature in each of the cells when the maximum of a peak in the output of the chromatographic column reaches the particular cell. The following fall in temperature would generally be equal to the preceding rise in temperature, except that there is an exchange of heat with the immediate surroundings. Therefore, as the front of a peak passes a given point, a certain amount of the heat evolved will be transported away so that the temperature expected under adiabatic conditions will not be reached. On the passage of the end of the peak this heat dissipates and the temperature will sink below the ideal starting temperature. The original temperature will once again be obtained by conduction from the surroundings. Typical changes in temperature are as shown by the signal traces of FIG. 5.

Figure 2:
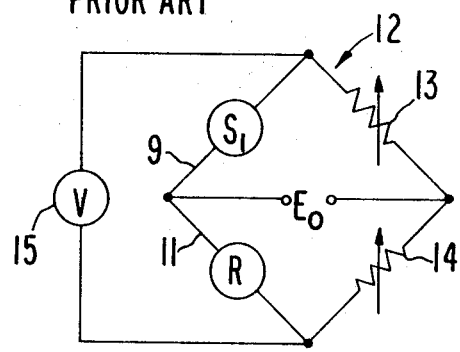
FIG. 2 is a schematic circuit diagram of a prior art microadsorption detector.

Each of the detector cells $S_1$, $S_2$ and R includes a thermistor sensing element 7 for sensing the change in temperature of the cell with adsorption and desorption. The prior art electrical circuit for connection of the thermistors of the sample $S_1$ and reference cells R, respectively, is shown in FIG. 2. Briefly, the thermistor of the sample cell $S_1$ and the thermistor of the reference cell R were connected in first and second arms, respectively, on the same side of a wheatstone bridge 12. Reference resistors 13 and 14 were connected in the remaining two arms of the bridge, on the opposite side thereof, for balancing the bridge, in the absence of a signal to be detected. The reference cell was filled with an inert packing material 5 such as glass beads, whereas the reference cell $S_1$ was filled with a relatively active adsorptive material.

The bridge was energized from a constant voltage supply 15 and the changes of temperature of the sensing cell $S_1$, relative to the reference cell R, were sensed by thermistors 7 and resulted in an unbalance of the bridge, producing an electrical output signal $E_o$. The output signal had the characteristic shape as shown by either of the signal traces depicted in FIG. 5.

The problem with this prior art arrangement is that it yields quantitative information but very little qualitative information. Often times the output signal would have a plurality of relatively closely spaced peaks and it would be desirable to differentiate the different sample constituents within the one composite peak.

Therefore, the adsorption detector 1, of the present invention, was constructed to include a second sensing cell $S_2$ employing a different adsorptive fill material 5 than that employed in the first sensing cell $S_1$. It is quite unlikely that two different sample constituents will have the same adsorptive characteristics for two different adsorptive materials, especially when the materials are selected to provide different adsorptive characteristics; for example, one of the adsorptive fill materials could be an ion exchange resin, whereas the other adsorptive material in the second sensing cell could be a surface adsorptive material. Alternatively, a polar surface adsorptive fill material may be used in one cell and a nonpolar surface adsorptive material used in the second cell. A comparison of the adsorptive characteristics of the sample on the two different adsorptive materials will yield qualitative results not obtainable by use of a single adsorptive fill material.

Figure 3:
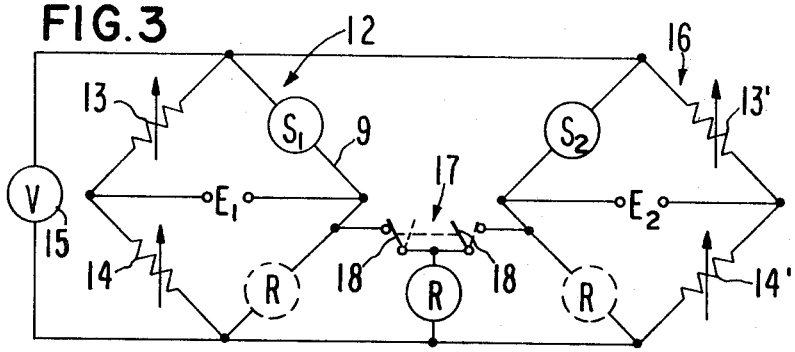
FIG. 3 is a schematic circuit diagram of a microadsorption detector incorporating features of the present invention.

Referring now to FIG. 3, there is shown a bridge network for use with the adsorptive detector 1 of FIG. 1. The circuit is essentially the same as that of FIG. 2 with the exception that it includes a second bridge network 16 connected in parallel with the first bridge 12. The second bridge network 16 includes the thermistor 7 of the second sensing cell $S_2$ connected in one side of the wheatstone bridge 16 with the thermistor 7 of the reference cell R. The other side of the wheatstone bridge 16 includes balancing resistors 13' and 14'. The output signal $E_2$ of the second bridge 16 is taken across the diagonal thereof, in the conventional manner.

Figure 4:
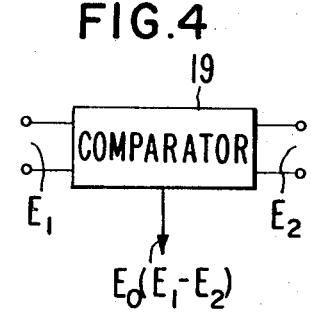
FIG. 4 is a schematic block diagram of a comparator employed for comparing the outputs of the circuit of FIG. 3.

A switching network 17 is provided for sequentially switching the thermistor 7 of the reference cell R into circuit in alternate ones of the bridges 12 and 16, at a relatively rapid rate. Although mechanically ganged switches 18 are shown, for the sake of explanation, it is to be understood that any conventional switching arrangement may be employed, such as commutators, gating diodes, and the like, in place of the mechanical switches 18. Also, a stage of synchronous detection referenced to the switching rate is preferably employed for detecting the output signals of the bridges 12 and 16 such that the pulsating effect of the switching on the output signals $E_1$ and $E_2$ can be eliminated. The synchronously detected output signals $E_1$, $E_2$ are then fed to a comparator 19 as shown in FIG. 4. The output of the comparator is an output signal determinative of the difference between the two output signals $E_1$ and $E_2$. Alternatively, the two synchronously detected output signals $E_1$ and $E_2$ may be fed to galvanometer recorders 21 and 22 for recording their respective output signals on the same time scale on a strip chart recorder for visual comparison.

Comparison of the absorptive characteristics of different sample constituents and different adsorbent material may be used to advantage in several ways. More particularly, the two active cells $S_1$ and $S_2$ can be filled with different types of adsorbent, as previously referred to above. It would be fortuitous that two different adsorbent materials would give the same relative response for chemically different compounds. Comparison of the output signals $E_1$ and $E_2$ from the two cells $S_1$ and $S_2$ provides qualitative information on the chemical identity of the sample material. Furthermore, one particular adsorbent may give a better response for many of the compounds in a sample, while another adsorbent gives a better response for the remaining compounds. An investigator, offered the additional degree of freedom of the second adsorbent, should be able to optimize his system for maximum response.

Moreover, overlapping microadsorption detector peaks may be difficult to quantitate. By the use of selective adsorbent materials in cells $S_1$ and $S_2$, such adsorbents having characteristics which complement each other, it is possible to achieve a greater separation between peaks. In an ideal case, alternative peaks would occur on each of the two chromatograms as schematically indicated by the signal traces in FIG. 5.

One additional use for the adsorption detector employing two sample cells $S_1$ and $S_2$ is for measuring relative strengths of adsorption of different sample-solvent-adsorbent combinations under conditions closely approximating the chromatographic column. Thus, valuable information regarding suitable combinations for packing various chromatographic columns may be obtained. The strength of adsorption of a column packing material in one cell $S_1$ is comparable directly to a standard adsorbent in the other cell $S_2$. Or the relative strengths of adsorption for two materials of interest are comparable directly.

Figure 6:
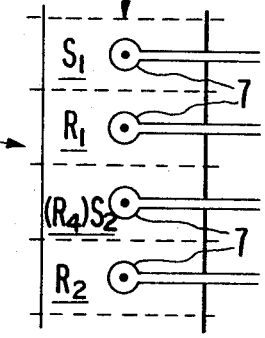
FIG. 6 is a schematic diagram of an alternative embodiment of the detector of the present invention.

Referring now to FIG. 6, there is shown an alternative adsorption detector 25 incorporating features of the present invention. Detector 25 is identical to detector 1 of FIG. 1 with the exception that an additional reference cell $R_2$ has been added serially in the flow path with the other cells $S_1$, $R_1$ and $S_2$. Detector 25 would be used in a bridge network of the type shown in FIG. 7. The bridge network of FIG. 7 is substantially the same as that previously described with regard to FIG. 3 with the exception that the second reference cell $R_2$ is placed in the second bridge 16 and the first reference cell $R_1$ is placed in arm 11 of the first bridge. The switching arrangement for switching the reference sample between the two bridges is thereby eliminated. The second reference cell $R_2$ may be packed with an inert or relatively inactive adsorbent fill material, such as glass beads, or it may be left empty. The two bridges 12 and 16 are balanced for the pairs of sensing and reference cells $S_1$ and $R_1$ and cells $S_2$ and $R_2$, respectively, in the absence of a sample constituent to be detected.

Figure 5:
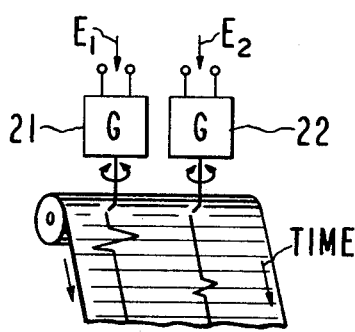
FIG. 5 is a schematic drawing, partly in block diagram form, of a recorder for comparing the outputs of the circuit of FIG. 3.

In operation, heat exchange of the sample constituents on the adsorbent in the sensing cells $S_1$ and $S_2$ produces output signals $E_1$ and $E_2$, respectively, which may then be compared in the comparators of FIGS. 4 or 5, as desired. The detector 25, bridge circuit of FIG. 7 and the comparators of FIGS. 4 and 5 may be used in precisely the same manner as previously described with regard to the three-cell detector 1. The advantage of the four-cell detector 25 is that the switching and synchronous detection features may be eliminated by the mere addition of one additional reference cell $R_2$.

Figure 8:
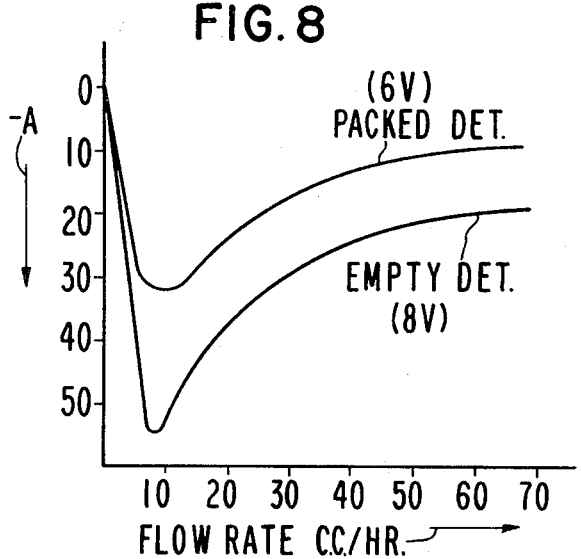
FIG. 8 is a plot of detected output signal amplitude versus flow rate for an empty detector and for a packed detector and for empty detectors at two different levels of bridge voltage.

Referring now to FIG. 8, there is shown a plot of recorder chart scale deflection, −A, versus flow rate in cc's per hour of the flow stream for two conditions of bridge voltage and two conditions for the pairs of detector cells (S−R pairs), namely, packed or empty. The curves of FIG. 8 indicate the fluctuations in background signal as a function of the flow rate. Thus, it is seen that a pulsating flow stream, such as that obtained by use of a pulsating pump, would introduce serious noise in the output signal. Therefore, it is desired to obtain means for compensating for the dependence of the output signal upon the flow rate of the stream to be detected. An interesting characteristic of the curves of FIG. 8 is that the flow rate dependence of the output signal from a pair of packed cells, i.e., ones packed with adsorbent or with an inert material, is substantially the same as that from a pair of empty cells. Furthermore, it is seen that by changing the bridge voltage the two curves can be brought into coincidence.

Figure 9:
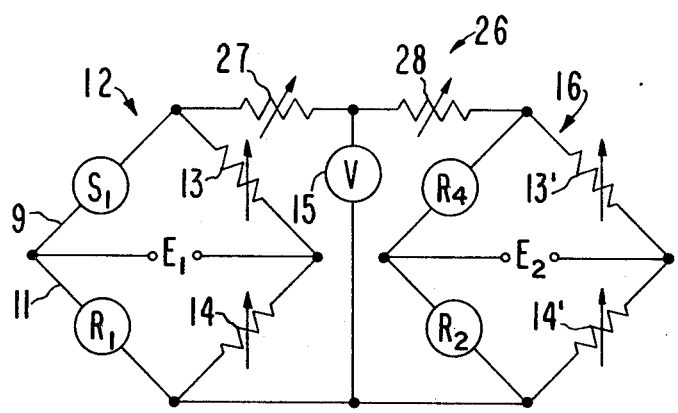
FIG. 9 is a circuit similar to that of FIG. 7 depicting an alternative embodiment of the present invention for eliminating flow sensitivity.

Referring now to FIG. 9, there is shown a bridge network 26 for compensating for changes in the output signal due to changes in the flow rate. More particularly, the bridge network 26 of FIG. 9 is substantially identical to that previously described with regard to FIG. 7 except that the second sensing or sample cell $S_2$ in bridge 16 has been replaced by reference cell $R_4$ which may be either an unpacked sensing cell $S_2$ or such a sensing cell $S_2$ packed with an inert packing material. In addition, a pair of variable resistors 27 and 28 have been provided for adjusting the voltages applied to the bridges 12 and 16, respectively.

Figure 10:
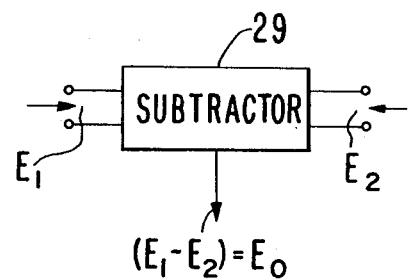
FIG. 10 is a schematic block diagram of a circuit for comparing the outputs of the circuit of FIG. 9.

The two output signals $E_1$ and $E_2$ from the bridge 26 are fed to a comparator or subtractor circuit 29, as shown in FIG. 10. In the subtractor circuit, the two input signals $E_1$ and $E_2$ are subtracted to obtain the output signal $E_0$ which is thereby corrected for flow rate fluctuations. If necessary, resistors 27 and 28 are adjusted to bring the flow rate characteristic curves into coincidence, as previously described with regard to FIG. 8. In this manner, the output signal $E_0$ is substantially completely corrected for flow rate fluctuations and this permits a pulsating type pump to be utilized for producing the flow in the sample stream 2.

Figure 11:
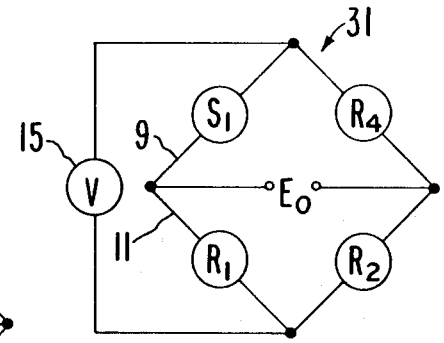
FIG. 11 is a schematic circuit diagram for an alternative detector circuit to that of FIG. 9.

Referring now to FIG. 11, there is shown an alternative bridge network 31 to that previously described with regard to FIGS. 9 and 10. In this embodiment, the reference cells $R_4$ and $R_2$ are placed in the two arms of the bridge on the opposite side of the bridge from arms 9 and 11 which contain the detector cells $S_1$ and $R_1$. The output signal $E_0$ is thereby compensated for fluctuations in flow rate and the only signal appearing at the output $E_0$ would be due to the heat exchange conditions occurring within the sensing or sample cell, $S_1$.

In all of the above bridge circuits, individual output signals from each of the cells are combined in pairs to form at least two separate composite output signals. For example, the output signal from the first sensing cell $S_1$ is combined with the output signal of the reference cell $R_1$ to produce a composite signal in the diagonal of the bridge which is relatively insensitive to changes in the ambient temperature, since ambient changes would influence both detectors in a like way. In other words, the combined output signal changes only when the thermal conditions in one of the cells changes relative to the thermal conditions in the other cell. Likewise, the second detector cell $S_2$ has its output combined with the output signal from the reference cell $R_1$ or, in the case of the four-cell detector, with the second reference $R_2$ to produce a second composite signal in the diagonal arm of the bridge. These two composite output signals may then be compared, as by a comparator which gives only the difference between the two or by simultaneously recording the two composite signals for visual comparison, as shown in FIG. 5.

Figure 12:
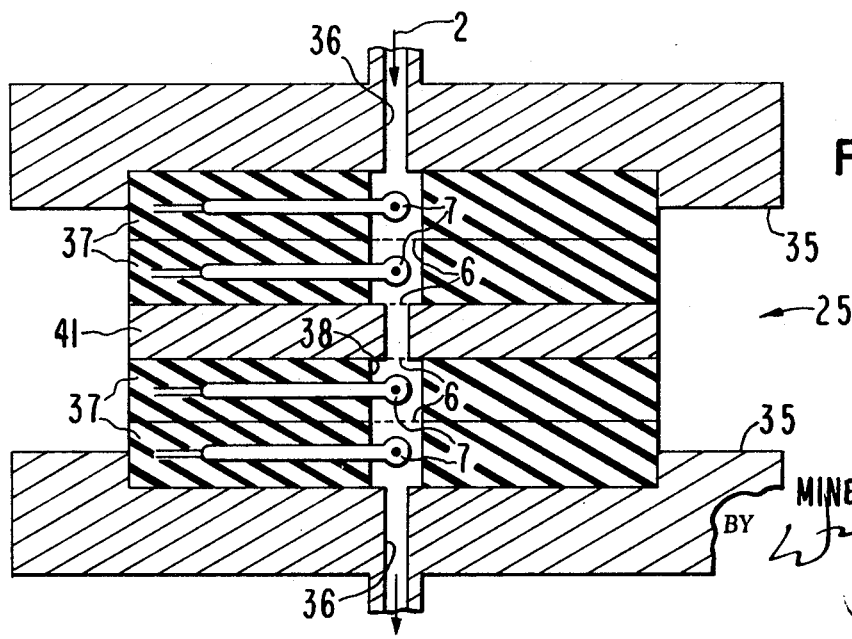
FIG. 12 is a longitudinal sectional view of a microadsorptive detector incorporating features of the present invention.

Referring now to FIG. 12, there is shown, in longitudinal section, a four-cell microadsorption detector 25 of the type schematically indicated in FIG. 6. The detector includes a pair of stainless steel disc-shaped flanges 35 having a central bore 36 therein to define a portion of the flow passageway for flow of the fluid stream 2 through the detector 25. A plurality of Teflon® discs 37 are centrally apertured at 38 and axially stacked in the space intermediate the flanges 35 to define the main body of the detector 25. The thermistors 7 are centrally mounted in each of the discs 37 with the thermistor element projecting into the flow stream 2. The filter membranes 6 separate the discs 37 to define the boundaries of each of the detector cells. Suitable packing material is placed within the cells defined by the spaces between the filter membranes 6. A metallic center disc 41 as of stainless steel is placed midway in the stack of the Teflon discs 37 for separating the upstream two detector discs 37 from the downstream two detector discs 37. The central passage in the center disc is constricted relative to the passageways through the Teflon discs 37 such that heat evolved into the flow stream 2 by the thermistor detectors in the upstream portion of the detector is absorbed by the center disc to render the downstream detectors relatively insensitive to flow rate conditions produced by the upstream detectors. This feature of the metallic heat absorbing disc between a pair of microadsorption cells forms the subject matter of and is claimed in U.S. Pat. No. 3,535,918 issued Oct. 27, 1970 and assigned to the same assignee as the present invention. Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a microadsorption detector, means forming a plurality of adsorption detector cells serially disposed in close proximity to each other along the flowpath for a fluid stream to be detected, each of said cells including a thermally responsive sensing element for deriving an output determinative of the adsorption in the respective cell of certain constituents of the fluid stream, THE IMPROVEMENT WHEREIN, at least one of said cells including active adsorptive packing material and the remainder of said cells having relatively inactive packing material, there are at least three of said serially disposed adsorption detection cells, means combining the individual outputs of each of said cells in pairs to form at least two separate composite output signals, such composite signals each comprising a combination of the outputs of at least two cells and means comparing the composite output signals.

2. The apparatus of claim 1 wherein said plurality of serially disposed adsorption cells comprises at least four of said adsorption cells.

3. The apparatus of claim 1 wherein at least two of said cells includes a relative active adsorptive packing material for a constituent of the fluid stream as compared to the adsorptive characteristics of the packing material, if any, of said third cell.

4. The apparatus of claim 1 wherein said comparing means includes a recorder for recording the separate composite signals for comparison.

5. The apparatus of claim 1 wherein said combining means includes a pair of wheatstone bridge networks, and wherein said comparing means compares the separate outputs of said pair of wheatstone bridge networks.

6. The apparatus of claim 2 wherein at least three of said detection cells each includes a relatively inert adsorptive fill material, if any, as compared to a relatively active fill material disposed within said fourth cell, means for combining the outputs of two pair of said cells to produce a pair of composite outputs, and means for comparing the composite outputs to derive an output which is relatively independent of the rate of flow of said stream.

7. The apparatus of claim 1 including a liquid chromatographic column disposed upstream of said detector cells such that said detector cells are disposed to detect the effluent liquid stream of said column.